US008634638B2

(12) United States Patent
Han et al.

(10) Patent No.: US 8,634,638 B2
(45) Date of Patent: Jan. 21, 2014

(54) REAL-TIME ACTION DETECTION AND CLASSIFICATION

(75) Inventors: Feng Han, Melville, NY (US); Hui Cheng, Bridgewater, NJ (US); Jiangjian Xiao, Plainsboro, NJ (US); Harpreet Singh Sawhney, West Windsor, NJ (US); Sang-Hack Jung, Lawrenceville, NJ (US); Rakesh Kumar, Monmouth Junction, NJ (US); Yanlin Guo, Vienna, VA (US)

(73) Assignee: SRI International, Menlo Park, CA (US)

( * ) Notice: Subject to any disclaimer, the term of this patent is extended or adjusted under 35 U.S.C. 154(b) by 1248 days.

(21) Appl. No.: 12/488,911

(22) Filed: Jun. 22, 2009

(65) Prior Publication Data

US 2009/0316983 A1    Dec. 24, 2009

Related U.S. Application Data

(60) Provisional application No. 61/074,224, filed on Jun. 20, 2008.

(51) Int. Cl.
*G06K 9/62* (2006.01)

(52) U.S. Cl.
USPC .......................................................... 382/159

(58) Field of Classification Search
None
See application file for complete search history.

(56) References Cited

U.S. PATENT DOCUMENTS

| | | | | |
|---|---|---|---|---|
| 2004/0120581 | A1* | 6/2004 | Ozer et al. | 382/224 |
| 2008/0123968 | A1* | 5/2008 | Nevatia et al. | 382/228 |
| 2008/0253664 | A1* | 10/2008 | Li et al. | 382/226 |

OTHER PUBLICATIONS

Zhang, H. et al, "SVM-KNN: Discriminative Nearest Neighbor Classification for Visual Category Recognition," Conference on Computer Vision and Pattern Recognition (CVPR'06), IEEE Computer Society, pp. 2126-2136 (2006).
Rosch, E., "Natural Categories," Cognitive Psychology, 4:328; p. 350 (1973).
Laptev, I. et al., "On Space-Time Interest Points," International Journal of Computer Vision, 64(2-3):107123 (2005).
Schuldt, C. et al., "Recognizing Human Actions: A Local SVM Approach," International Conference on Pattern Recognition (ICPR'04), pp. 3236-3240 (2004).
Dollar, P. et al., "Behavior Recognition Via Sparse Spatio-Temporal Features," Proceedings 2nd Joint IEEE International Workshop on Performance Evaluation of Tracking and Surveillance, Beijing, pp. 65-72 (Oct. 15-16, 2005).
Niebles, J.C. et al., "Unsupervised Learning of Human Action Categories Using Spatial-Temporal Words," British Machine Vision Conference, p. III:1249 (2006).
Nowozin, S. et al., "Discriminative Subsequence Mining for Action Classification," International Conference on Computer Vision, IEEE Computer Society (2007).
Laptev, I. et al., "Retrieving Actions in Movies," International Conference on Computer Vision (2007).

(Continued)

*Primary Examiner* — Chan Park
*Assistant Examiner* — Elisa Rice
(74) *Attorney, Agent, or Firm* — Moser Taboada

(57) ABSTRACT

The present invention relates to a method and system for creating a strong classifier based on motion patterns wherein the strong classifier may be used to determine an action being performed by a body in motion. When creating the strong classifier, action classification is performed by measuring similarities between features within motion patterns. Embodiments of the present invention may utilize candidate part-based action sets and training samples to train one or more weak classifiers that are then used to create a strong classifier.

12 Claims, 5 Drawing Sheets

(56) References Cited

OTHER PUBLICATIONS

Ke, Y. et al., "Event Detection in Crowded Videos," International Conference on Computer Vision (2007).
Ke, Y. et al., "Efficient Visual Event Detection Using Volumetric Features," International Conference on Computer Vision (2005).
Bouchard, G. et al "Hierarchical Part-Based Visual Object Categorization," Proceedings IEEE Conf. on Computer Vision and Pattern Recognition (2005).
Nowak, E. et al., "Sampling Strategies for Bag-of-Features Image Classification," Proceedings of the European Conference on Computer Vision (2006).
Freund, Y. et al., "A Decision-Theoretic Generalization of Online Learning and an Application to Boosting," Journal of Computer and System Science, p. 55 (1997).
Schapire R.E., "The Strength of Weak Learnability," Machine Learning, 5(2):197227 (1990).
Viola et al., "Rapid Object Detection Using a Boosted Cascade of Simple Features," Proceedings IEEE Conf. on Computer Vision and Pattern Recognition (2001).
Dalal, N. et al., "Human Detection Using Oriented Histograms of Flow and Appearance," Proceedings of the European Conference on Computer Vision (2006).
Dalal, N. et al., "Histograms of Oriented Gradients for Human Detection," Proceedings IEEE Conf. on Computer Vision and Pattern Recognition (2005).
Boiman, O. et al., "Detecting Irregularities in Images and in Video," International Conference on Computer Vision, pp. 462-469, IEEE Computer Society, Washington DC (2005).
Zelnik-Manor, L. et al., "Event-Based Analysis of Video," Proceedings IEEE Conference on Computer Vision and Pattern Recognition, IEEE Computer Society, Kauai, Hawaii, vol. 2, pp. 123-130 (2001).
DeMenthon, D. et al., "Video Retrieval Using Spatio-Temporal Descriptors," Multimedia '03:Proceedings of the Eleventh ACM International Conference on Multimedia, New York, NY, ACM Press, pp. 508-517 (2003).
Efros, A. et al., "Recognizing Action at a Distance," International Conference on Computer Vision, IEEE Computer Society, Washington, DC, p. 726 (2003).
Jhuang, H. et al., "A Biogically Inspired System for Action Recognition," International Conference on Computer Vision (Oct. 2007).
Shechtman, E. et al., "Space-Time Behavior Based Correlation," IEEE Conference on Computer Vision and Pattern Recognition, IEEE Computer Society, Washington, DC, pp. 405-412 (2005).
Zhong, H. et al, "Detecting Unusual Activity in Video," Proceedings IEEE Conference on Computer Vision and Pattern Recognition, IEEE Computer Society, Washington, DC, pp. 819-826 (2004).

\* cited by examiner

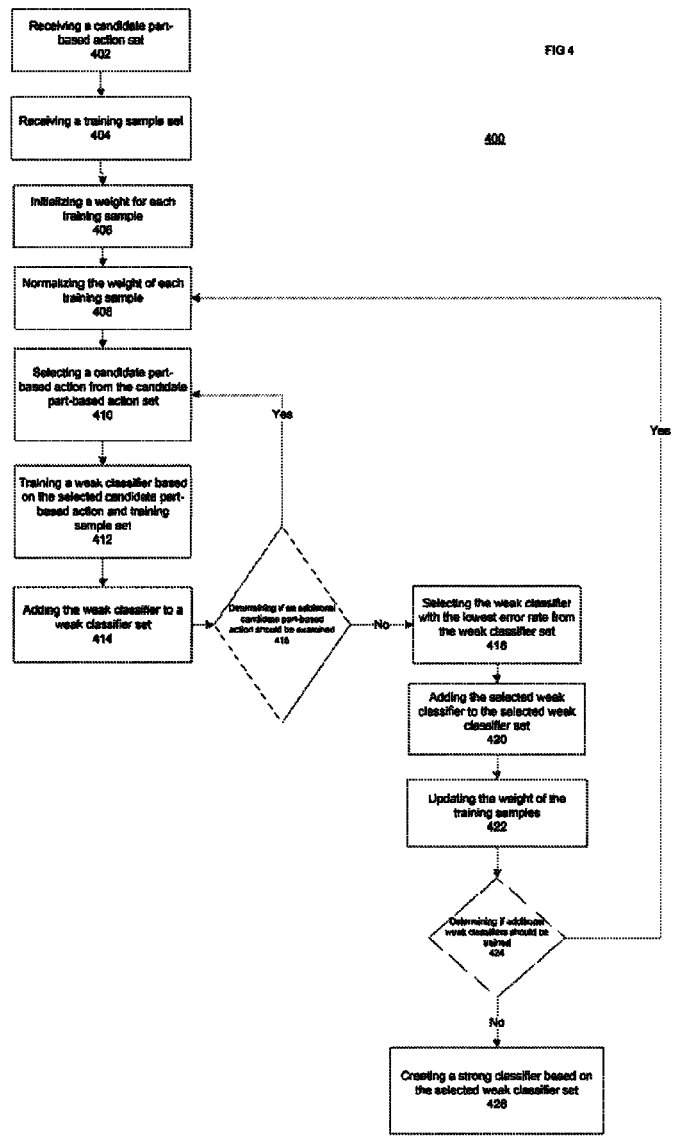

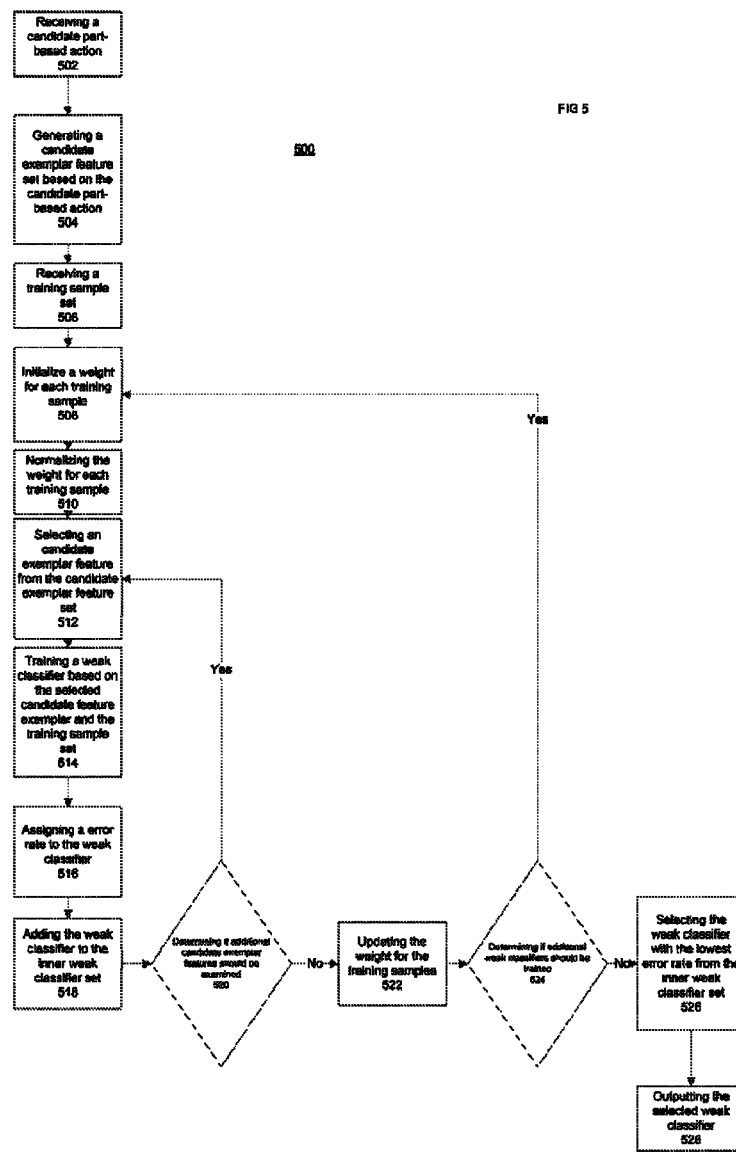

REAL-TIME ACTION DETECTION AND CLASSIFICATION

CROSS-REFERENCE TO RELATED APPLICATIONS

This application claims the benefit of U.S. Provisional Patent Application No. 61/074,224 filed Jun. 20, 2008, the disclosure of which is incorporated herein by reference in its entirety.

GOVERNMENT RIGHTS IN THIS INVENTION

This invention was made with U.S. Government support under contract number NBCH-C-07-0062. The U.S. Government has certain rights in this invention.

FIELD OF THE INVENTION

The present invention relates generally to a vision method and system, and more particularly to a method and system for creating a strong classifier based on motion patterns wherein the strong classifier may be used to determine an action being performed by a body in motion.

BACKGROUND OF THE INVENTION

Human action analysis based on motion pattern, often in the form of video images, play an important role in visual surveillance and video retrieval applications. Many applications could benefit from the detection and recognition of target actions using video images or specific semantic descriptions. Due to various factors such as large individual variations in clothes, accessories, appearance, scale, viewpoint, human body articulation and self-occlusion, and dynamic background clutter, motion pattern analysis remains a very challenging problem and has yet to achieve the accuracy of manual human analysis. In addition, one significant feature of manual human visual recognition which is difficult to automate, is that a human manually performing such recognition can be trained with very few examples, which is a highly desirable capability in motion pattern recognition.

With recent advancements in object recognition, computer analysis has seen significant progress in the object detection domain. However, the successful application of such schemes in 2D object recognition has not yet fully translated into interpreting motion patterns and performing action recognition in the 3D spatio-temporal domain. Lower performance is achieved for action recognition within the 3D domain as compared to the 2D domain.

In general, motion patterns appear distinctive and compact. Within a motion pattern, substantially different actions can often be easily separated (e.g. hitting a baseball v. shooting a basketball). However within the prior art, many actions usually share common sub-motions and sometimes substantial parts of motion patterns between different actions are quite similar with only subtle differences. However, local feature based approaches that would inspect subsets of features in select locations within a motion pattern become more susceptible to misalignments in feature locations and less optimal in differentiating motion pattern differences.

Accordingly, the prior lacks, a system and method for creating a classifier configured to utilize local features within a motion pattern as well as global features within the motion pattern to effectively identify the motion pattern.

SUMMARY OF THE INVENTION

According to an embodiment of the present invention, the above identified problems are addressed by creating a strong classifier that focuses on the features within an active portion of a motion pattern. The term "classifier," is intended to included, but is not limited to, a function used to map a given portion of data to a particular category. When creating a classifier, action classification may be performed by measuring similarities between features within a motion pattern. An "exemplar" is used to perform comparisons between features. The term "exemplar," is intended to include, but is not limited to, an example of a specific motion pattern or portion of a motion pattern, which shares substantially all of the characters of the motion pattern or portion thereof with a given motion pattern. According to certain embodiments of the present invention, motion pattern recognition is accomplished by calculating the distance between exemplars.

In addition to utilizing exemplars to measure the similarities between features within a motion pattern, embodiments of the present invention focus on active body parts within the motion pattern, when creating a classifier. Given that large portions of the motion patterns used to create a classifier lack active motion information, focusing on active features reduces the portion of the motion pattern that must be address.

The deficiencies in the prior art are addressed by the method of creating a strong classifier, comprising the steps of (i) receiving, by a computer, a training sample set and a candidate part-based action set, (it) creating a plurality of weak classifier sets based on the training sample set and the candidate part-based action set, and, (iii) creating the strong classifier based on the plurality of weak classifier sets to create a strong classifier.

BRIEF DESCRIPTION OF THE DRAWINGS

The present invention will be more readily understood from the detailed description of exemplary embodiments presented below considered in conjunction with the attached drawings, of which:

FIG. 4 is a flow chart further illustrating the steps taken in performing the method of creating a strong classifier; and FIG. 5 is a flow chart illustrating the steps taken in creating a weak classifier.

DETAILED DESCRIPTION OF THE INVENTION

Figure 1:
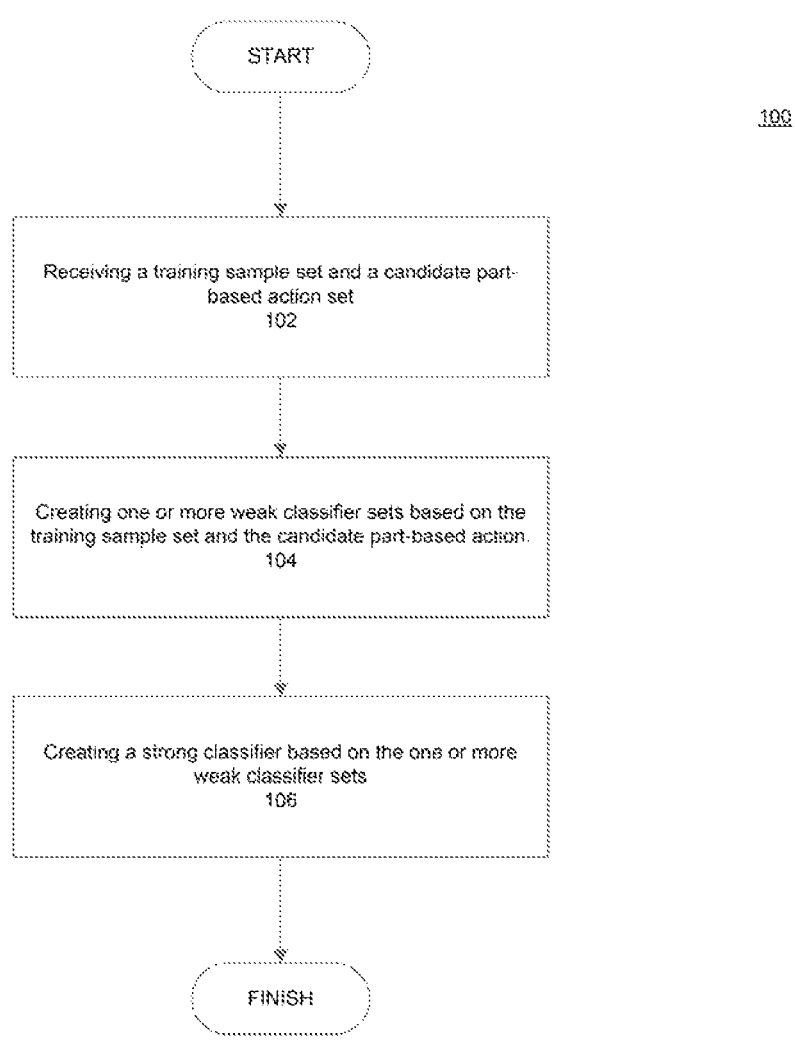
FIG. 1 is a flow chart illustrating the steps taken in performing a method for creating a strong classifier.

FIG. 1 illustrates an embodiment of the present invention wherein the method 100 includes a plurality of steps utilized to create a strong classifier. The method 100 begins with the step of receiving a training sample set and a candidate part-based action set, at step 102. According to an embodiment of the present invention, a candidate part-based action set may be utilized along with a training sample set to create a strong classifier that can accurately identify human action or non-human action.

The term "training sample" is intended to include, but is not limited to, a spatial-temporal sample video wherein the action being conducted in the spatial-temporal tube is known. A spatial-temporal sample may be an example of an action within the spatial-temporal domain. A training sample may be positive or negative. In the case of a positive training sample, the spatial-temporal sample video represents an action that a given classifier is being trained to detect. In contrast, a negative training sample is directed to a spatial-temporal sample video representing an action that a given classifier is not being trained to detect. For example, in an embodiment of the present invention wherein the classifier is being trained to detect the action of running, a spatial-temporal exemplar describing the action of running would be considered a positive training sample, wherein a spatial-temporal sample video describing the action of jumping would be considered a negative training sample. It should be noted that a training sample could be a spatial-temporal exemplar describing a global action (e.g., running or jumping) or a local action (e.g., a leg swinging or arm flexing). In addition, the training sample could include specific features that further describe global actions or local actions.

The term "candidate part-based action" is intended to include, but is not limited to, a spatial-temporal exemplar used by a classifier, wherein the candidate part-based action is compared with a training sample. A candidate part-based action describes a local action (e.g., a leg swinging or arm flexing) while a candidate part-based action set, comprising multiple candidate part-based actions, and describes a global action (e.g., running or jumping).

Figure 2:
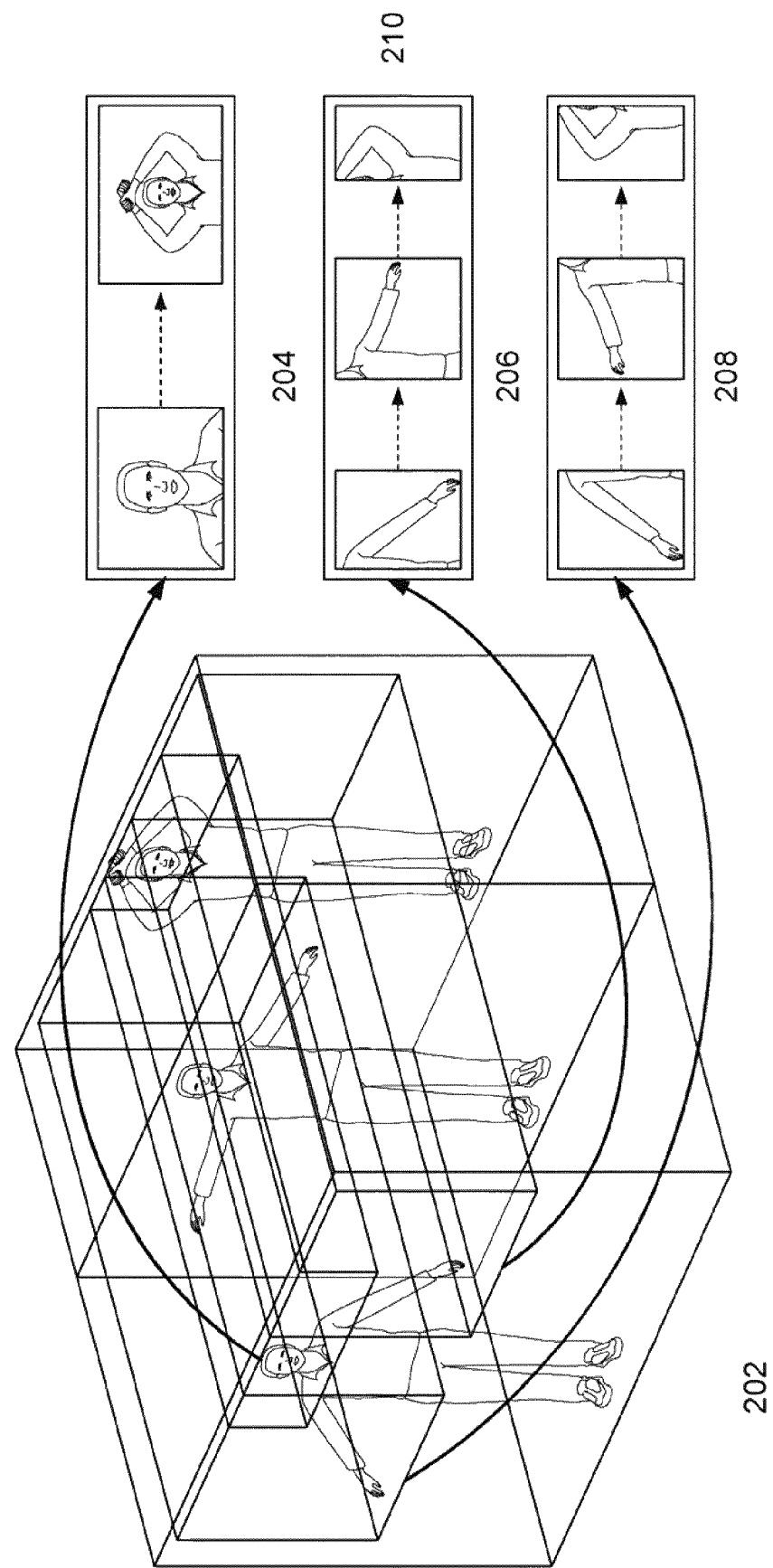
FIG. 2 is a figure illustrating a part-based action set and related part-based actions.

To characterize a motion pattern comprising human action and non-human action, one may model the motion pattern globally or locally. As illustrated in FIG. 2, the action of a human waving his hands can be either represented with a single global exemplar 202, defining the full body, or three local exemplars 204-208, wherein each local exemplar focuses on a different spatial area. Both the training sample and the candidate part-based action set can be segmented into local exemplars.

Following the receipt of a training sample set and a candidate part-based action set, in step 102, method 100 continues by creating one or more of weak classifier sets based on the training sample set and the candidate part-based action set, at step 104. The term "weak classifier," or "initial classifier" is the classifieds) created by use of the training sample set and the candidate part-based action set, prior to creation of the classifier with higher capability (the "strong" or "subsequent" classifier) as compared to the initial classifier(s). It is understood that the terms "weak" and "strong" are relative to each other. The classification capability of a "weak classifier" may be equal to or slightly better than random classification. However, the classification capability of a "weak classifier" can be substantially higher than random classification, but is necessarily lower than the "strong classifier" which is the result of the present invention. In contrast, a "strong classifier," or strong video classifiers, has classification capability that is at least higher than that of a weak classifier. According to an embodiment of the present invention, a weak classifier is trained, by comparing features of a training sample with features of a candidate part-based action. The weak classifier may calculate the distances between a training sample feature and its corresponding candidate part-based action feature. Based on this calculation, the weak classifier will attempt to determine if the training sample feature and candidate part-based action feature are describing a similar feature. When the training sample being analyzed is a positive training sample, the weak classifier makes a correct determination if it is established that the training sample feature and candidate part-based action feature are similar. If the training sample being analyzed is a negative training sample, the weak classifier makes a correct determination if it is established that the training sample feature and candidate part-based action feature are not similar. Each weak classifier is assigned an error rating based on its ability make a correct determination. The error rating for each weak classifier is utilized when selecting the weak classifiers to be used when creating the strong classifier. This process of creating a plurality of weak classifier sets is discussed in greater detail below in reference to FIGS. 4 and 5.

Having created one or more weak classifier sets in step 104, the method 100 continues at step 106 by utilizing the one or more weak classifier sets to create a strong classifier. The strong classifier is obtained by linearly adding the selected weak classifiers. According to certain embodiments of the present invention, each of the weak classifiers may have corresponding weights wherein the weights may be utilized when combining the weak classifiers to create a strong classifier.

Figure 3:
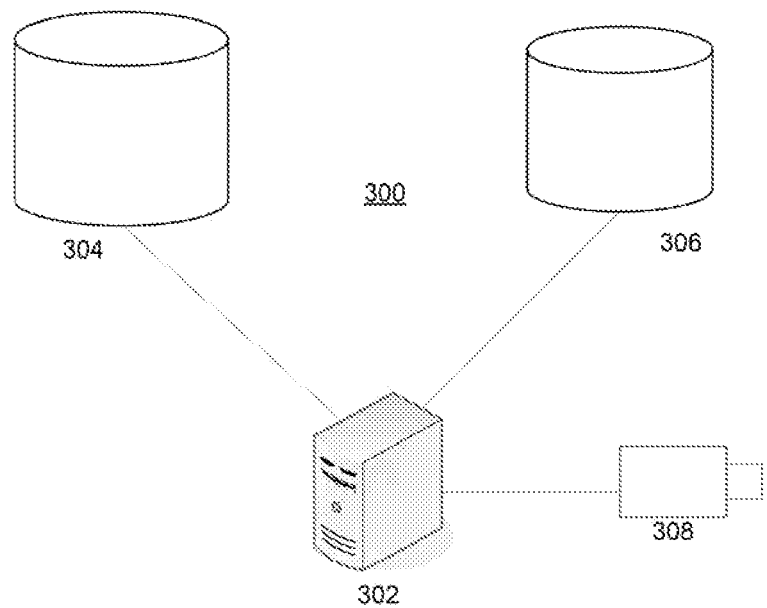
FIG. 3 is a block diagram of a hardware architecture for implementing the method for creating a strong classifier.

FIG. 3 illustrated a hardware system according to an embodiment of the present invention wherein the method 100 is performed on the system 300. As described in FIG. 3, the system 300 may comprise a computer 302 communicatively connected to a database 304 and an additional database 306. The database 304 is configured to store training samples and the additional database 306 is configured to store candidate part-based action sets. In alternative embodiments of the present invention, the training samples and candidate part-based action sets could be stored in a single database. In addition, training samples and/or candidate part-based action sets could be generated in real-time via a video capture deceive 308 communicatively connected to the computer 302. The computer 302 is configured to process the test samples and candidate part-based action sets to create a strong classifier.

To create a strong classifier configured to perform action recognition, an embodiment of the present invention utilizes a framework consisting of two nested processes. The outer process is used to select a candidate part-based action from a candidate part-based action set and to combine a plurality of weak classifiers into a strong classifier. The inner process utilizes features of the selected candidate part-based action to determine the effectiveness of a plurality of weak classifiers in matching a candidate part-based action with a training sample. An embodiment of the outer process is described in greater detail in FIG. 4 and an embodiment of the inner process is described in greater detail in FIG. 5.

FIG. 4 illustrates an embodiment of the present invention comprising an outer process 400, wherein the outer process 400 creates a strong classifier based on a set of selected weak classifiers. The outer process 400 begins by receiving a candidate part-based action set, at step 402. The candidate part-based action set may describe human or non-human action, this could include running, jumping or carrying a gun.

Following the receipt of the candidate part-based action set, at step 402, the outer process 400 continues by receiving a training sample set, at step 404. The training sample set may include a plurality of training samples, wherein each training sample describes a motion pattern. For example, the training sample set could include one hundred training samples wherein fifty of the training samples describe a human swinging a tennis racket and the other fifty describe a human performing an action that is not swinging a tennis racket. If the candidate-part based action set received at step 402 describes a person swinging a tennis racket, the fifty training samples describing a person swinging a tennis racket would be considered positive training samples. In contrast, the fifty training samples describing a person not swinging a tennis racket would be considered negative training samples.

According to an embodiment of the present invention, a weight is associated with each training sample. The weight for each training sample is initialized at step 406. Throughout the execution of the outer process 400, the weight associated with each training sample may change as a result of a weak classifier's ability to correctly recognize the given training sample. In instances wherein a classifier incorrectly indentifies a given training sample, the weight of that training sample may be increased. Increasing the weight associated with a given training sample signifies that the training sample may be difficult to correctly recognize. In contrast, correctly recognizing a training sample may result in decreasing the weight associated with the training sample and signify that the training sample is easy to recognize. When initializing the weight of the training samples, at step 406, all training samples are assigned the same weight, given that the training samples have yet to be analyzed.

The outer process 400 may analyze a plurality of candidate part-based actions in order to produce a strong classifier. Prior to analyzing a successive candidate part-based action, the weight associated with each training sample may be updated.

According to the embodiment of the present invention described in FIG. 4, the weight of each training sample may be normalized at step 408. As described above, the weight associated with a training sample is based on the ability of a weak classifier to effectively recognize the training sample. In the event that a weak classifier incorrectly recognizes a given training sample, the weight associated with the training sample may be increased. In contrast, the weight associated with a training sample may be decreased as a result of correct recognition. Despite the fact that the weights associated with training samples may differ, embodiments of the present invention may normalize these weight, as performed at step 408. For example, normalization could include adjusting the weight associated with each training sample so that the sum of ail weights equal one. Alternative normalization algorithms may be utilized to normalize the weights associated with the training samples.

When performing action recognition, certain body motions many provide a better determination as to the nature of the action. For example, when identifying a human clapping their hands, as illustrated in FIG. 2, it may be more effective to analyze the movement of the person's hands, as opposed to the movement of their legs. As a result, step 410 selects a candidate pan-based action to be analyzed from the candidate part-based action set based on the effectiveness of the candidate part-based action in signaling the action being performed. As illustrated in FIG. 2, the candidate part-based action set 210 may include multiple candidate part-based actions 204-208. In the first iteration of steps 410-416, the candidate part-based action 204 may be selected to be analyzed. According to certain embodiments of the present invention, all candidate part-based actions included in a candidate part-based action set will be analyzed when producing a strong classifier. Alternatively, certain embodiments of the present invention may analyze a given number of candidate part-based actions or an embodiment of the present invention may analyze candidate part-based actions until a given quantity of weak classifiers have been trained.

Having selected a candidate part-based action from the candidate part-based action set, in step 410, the outer process 400 continues by training a weak classifier using the selected candidate part-based action and the training sample set. This process is conducted by comparing features of the candidate part-based action with features of the training samples. This process is performed by the inner process 500, described in greater detail in FIG. 5.

FIG. 5 illustrates an embodiment of the present invention comprising the inner process 500 wherein the inner process 500 outputs a weak classifier. The weak classifier provided by the inner process 500 is utilized by the outer process 400 to create a strong classifier.

The inner process 500 begins at step 502 by receiving a candidate part-based action. The candidate part-based action may be provided by the outer process 400. As described above, the candidate part-based action may represent a local action within a global action. As described in reference to FIG. 2, the candidate part-based action 208 describes the local action of a person clapping their right hand, wherein the global action is the entire person clapping their hands.

Following the receipt of the candidate part-based action, at step 502, the inner process 500 generates a candidate part-based spatial-temporal exemplar set, at step 504, herein referred to as a candidate exemplar feature set. The candidate exemplar feature set comprises a plurality of candidate exemplar features describing different features of the candidate part-based action. As described in greater detail below, each candidate exemplar feature may be embodied in a differential histogram of oriented gradients (dHOG).

Features, such as shape and motion cues, may be effective when performing action recognition. For shape features, a dHOG may be used to model the shape feature. For motion features, a histogram of optical flow may be used to model the feature.

Following the generation of a candidate part-based spatial-temporal exemplar set based on the candidate part-based action, at step 504, the inner process 500 receives the training sample set, at step 506. The training sample set may receive the training sample from the outer process 500.

As described above with reference to the outer process 400, a weight for each of the training samples is initialized at step 508 and normalized at step 510.

According to the inner process 500 described in FIG. 5, a candidate exemplar feature from within the candidate exemplar feature set is selected at step 512. The selected candidate exemplar feature will be the characteristic upon which the weak, classifier examines the training sample set.

According to certain embodiment of the present invention, the candidate exemplar feature may be selected through the creation of a dHOG. The process of creating a dHOG comprises four steps. First, a motion mask is computed to remove background or other noise from the set of video frames describing the candidate exemplar feature or training sample. Creating a motion mask allows for the active portions of the video frame set to be addressed while the inactive portion of video frame set is not addressed. Secondly, an integral histogram is computed wherein filtered pixels within the motion mask are used. As a result, a uniform grid is mapped to the active portion of the set of video frames. Thirdly, centroids of ellipse contours are fixed within the uniform grid and further mapped to the active portion of the set of video frames. Finally, the motion trajectory for each ellipse is estimated by examining a plurality of video volumes thereby produce a spatial and temporal movement of the ellipses through the set of video frames.

The resulting dHOG is a sparse yet robust en-coding of three dimensional motion that can be used to compare three dimensional features. The dHOG can estimate the motion of a body part as it searches through a set of video frames to track contours of matching shapes. The dHOG does not suffer from interference as a result of background noise or other forms of noise.

Given that dHOGs are efficient when comparing three dimensional features, dHOGs are created to represent the candidate exemplar feature as well as the feature exemplars within the training sample set. These dHOGs may be used by the weak classifier in step 514.

Following the selection of a candidate exemplar feature from within the candidate exemplar feature set, at step 512, the inner process 500 continues by training a weak classifier based on the selected candidate feature exemplar and the feature exemplars within the training sample set, at step 514. The weak classifier utilizes a classification function in which the distances between features of the candidate feature exemplar and the corresponding features of the training samples are calculated. The weak classifier may utilize dHOGs representing the candidate exemplar feature and dHOGs representing features within each of the training samples to compute the distance between the training samples and the candidate exemplar feature. Based on the calculated distance, the weak classifier attempts to correctly identify each training sample as either representing the same action as the candidate exemplar feature or as not representing the same feature as the candidate exemplar feature. Given that the training sample set includes both positive and negative samples, the weak classifier may correctly recognize a positive training sample by determining that the training sample does correspond to a candidate exemplar feature or the weak classifier may correctly recognize a negative training sample by determining that the training sample does not correspond to a candidate exemplar feature.

Based on the frequency of correct and incorrect identification made by the weak classifier in step 514, the weak classifier is assigned an error rate. The error rate for the weak classifier corresponds to the accuracy with which training samples are recognized. Given that training samples may be weighted, an error rate for a weak classifier may be affected differently based on the weight of the training sample being addressed. For example, correctly identifying a training sample with a weight of 0.5 may have a more positive effect on the error rate of the weak classifier than correctly identifying a training sample with a weight of 0.1. Incorrectly identifying a training sample will have a similar affect on the error rating of a weak classifier.

Following the assignment of an error rate to the weak classifier, at step 516, the inner process 500 continues by adding the weak classifier to the inner weak classifier set, at step 518. The inner weak classifier set includes a plurality of weak classifier training during the inner process 500. The inner weak classifier set is used to store the weak classifiers prior to selecting the weak classifier with the lowest error rate, at step 526.

In certain embodiment of the present invention, it may be advantageous to analyze more than one candidate exemplar feature. As such, step 520 of the inner process 500 determines if addition candidate exemplar features are to be examined. In an embodiment of the present invention where all candidate exemplar features within a given candidate exemplar feature set are examined, the inner process 500 will return to step 512 to examine any additional candidate exemplar features that have not been examined. This process may repeat until all candidate exemplar features have been examined. As a result of each iteration of this sub-process, an additional weak classifier is added to the inner weak classifier set. In an alternative embodiment of the present invention, this sub-process could repeat until a give number of weak classifiers have been added to the inner weak classifier set.

If it is determined that no additional candidate exemplar features are to be examined, the inner process 500 continues at step 522 wherein the weight associated with each training sample may be updated. As described above, the weight associated with each training sample may be increased or decreased as a result of the ability of a weak classifier to effectively recognize the training sample.

Having added one or more weak classifiers to the inner weak classifier set at step 516, it may be determined at step 524 that additional weak classifiers should be added to the inner weak classifier set. If the inner weak classifier set requires additional weak classifiers, the inner process 500 will return to step 508. The inner process 500 will repeat steps 508 through 524 until it is determined that the size of the inner weak classifier set is sufficient. Once the size of the inner weak classifier set is determined to be sufficient at step 524, the inner process 500 continues to step 526 to select a weak classifier from within the inner weak classifier set. In order to determine the most effective weak classifier trained by the inner process 500, the error rates associated with each weak classifier within the inner weak classifier set is examined. The weak classifier associated with the lowest error rate may be selected from the inner weak classifier set and established as the weak classifier that will be provided to the outer process 400. The weak classifier provided to the outer process 400 retains the error rated assigned during inner process 500.

Returning to the outer process 400, the outer process 400 adds the weak classifier created by the inner process 500 to a weak classifier set, at step 414. The weak set includes all weak classifier created by the inner process 500 during a single iteration between steps 408 and 424. As a result, a new weak classifier set is utilized for each iteration between steps 424 and 408.

In certain embodiment of the present invention, it may be advantageous to analyze more than one candidate part-based action. As such, step 416 of the outer process 400 determines if addition candidate part-based actions are to be examined, in an embodiment of the present invention where all candidate part-based actions within a given candidate part-based action set are examined, the outer process 400 will return to step 410 to examine any additional candidate part-based action. This process may repeat until all candidate part-based actions have been examined. As a result of each iteration, the inner process 500 is executed, an additional weak classifier is added to the weak classifier set. In an alternative embodiment of the present invention, this sub-process could repeat until a give number of weak classifiers have been added to the weak, classifier set. In a further alternative embodiment of the present invention, this sub-process could repeat until the weak classifier set contains enough weak classifiers to produce a desired strong classifier.

Once it is determine that no additional candidate part-based actions are to be examined, the outer process 400 continues at step 418 with the selection of a weak classifier from the weak classifier set. The weak classifier with the lowest error rate is selected from the weak classifier set, at step 418 and added to the selected classifier set, at step 420. The selected weak classifier set is configured to store the weak classifier with the lowest error rate for each iteration between step 410 and 424.

Following the addition of the selected weak classifier to the selected weak classifier set, at step 422, the outer process 400 continues at step 422, where the weight associated with each training sample is updated. As described above, the weight associated with the training samples may be increased or decreased as a result of the ability of a weak classifier to effectively recognize the training sample.

The outer process 400 continues at step 424 by determining if a sufficient number of weak classifiers have been added to the selected weak classifier set. If the selected weak classifier set requires additional weak classifiers, the outer process 400 will return to step 408. The outer process 400 will repeat steps 408 through 424 until it is determined that the size of the selected weak classifier set is sufficient. A sufficient number of weak classifiers may be present when the weak classifier set contains a given number of weak classifiers or when the capabilities of the weak classifiers within the weak classifier set have reached a particular threshold.

Finally, the outer process 400 concludes at step 426 wherein the weak classifiers within the selected weak classifier sets are combined to create a strong classifier. Linear addition of the selected weak classifiers may be used to create the strong classifier.

As a result, embodiments of the present invention describe a method and system for creating a strong classifier to be used in human action classification and detection. Rather than addressing a single action, embodiments of the present invention focus on candidate part-based actions and candidate features exemplars within the candidate part-based actions through the use of the above described outer process and inner process.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

The invention claimed is:

1. A computerized method for creating a classifier, comprising the steps of:
    receiving, by a computer, a training sample set and a candidate part-based action set;
    creating, by the computer, one or more weak classifier sets based on the training sample set and the candidate part-based action set wherein the weak classifier sets have assigned error rates based on a comparison of the training sample set and the candidate part-based action set; and
    creating, by the computer, a strong classifier based on the one or more weak classifier sets by combining a first weak classifier with a lowest assigned error rate from a selected first weak classifier set with a second weak classifier with a lowest assigned error rate from a selected second weak classifier set.

2. The computerized method of claim 1, wherein creating the one or more weak classifier sets based on the training sample set and the candidate part-based action set, further comprises:
    selecting a first candidate part-based action from the candidate part-based action set;
    utilizing a first weak classifier to compare the first candidate part-based action with one or more of the training samples included in the training sample set;
    assigning an error rate to the first weak classifier as a result of the comparison of the selected candidate part-based action with the one or more training samples; and
    adding the first weak classifier to a first weak classifier set from the one or more weak classifier sets;
    selecting a second candidate part-based action from the candidate part-based action set;
    utilizing a second weak classifier to compare the second candidate part-based action with one or more of the training samples included in the training sample set;
    rating the second weak classifier as a result of the comparison of the selected candidate part-based action with the one or more training samples; and
    adding the second weak classifier to the first weak classifier set.

3. The computerized method of claim 1, wherein the first weak classifier utilizes an exemplar feature of the first candidate part based action and an exemplar feature of the one or more training samples when comparing the first candidate part based action with the one or more training samples.

4. The computerized method of claim 1, further comprising the step of:
    identifying a motion pattern through the use of the strong classifier.

5. A non-transitory computer-readable storage medium configured to store computer code for implementing a method for creating a classifier, wherein the computer code comprises:
    code for receiving a training sample set and a candidate part-based action set;
    code for creating one or more weak classifier sets based on the training sample set and the candidate part-based action set where the weak classifier sets have assigned error rates based on a comparison of the training sample set and the candidate part-based action set; and
    creating, by the computer, a strong classifier based on the one or more weak classifier sets by combining a first weak classifier with a lowest assigned error rate from a selected first weak classifier set with a second weak classifier with a lowest assigned error rate from a selected second weak classifier set.

6. The computer-readable storage medium of claim 5, wherein the code for creating the one or more weak classifier sets based on a training sample set and the candidate part-based action set, further comprises:
    code for selecting a first candidate part-based action from the candidate part-based action set;
    code for utilizing a first weak classifier to compare the first candidate part-based action with one or more of the training samples included in the training sample set;
    code for assigning an error rate to the first weak classifier as a result of the comparison of the selected candidate part-based action with the one or more training samples; and
    code for adding the first weak classifier to a weak classifier set from the one or more weak classifiers sets;
    code for selecting a second candidate part-based action from the candidate part-based action set;
    code for utilizing an second weak classifier to compare the second candidate part-based action with one or more of the training samples included in the training sample set;
    code for rating the second weak classifier as a result of the comparison of the selected candidate part-based action with the one or more training samples; and
    code for adding the second weak classifier to the first weak classifier set.

7. The computer-readable storage medium of claim 5, wherein the first weak classifier utilizes an exemplar feature of the first candidate part based action and an exemplar feature of the one or more training samples when comparing the first candidate part based action with the one or more training samples.

8. The computer-readable storage medium of claim 5, further comprising:
    code for identifying a motion pattern through the use of the strong classifier.

9. A system for creating a classifier, comprising:
    a computer configured to:
        receive a training sample set, from a first database and a candidate part-based action set, from a second database;
        create one or more weak classifier sets based on the training sample set and the candidate part-based action set where the weak classifier sets have assigned error rates based on a comparison of the training sample set and the candidate part-based action set; and create a strong classifier based on the one or more weak classifier sets by combining a first weak classifier with a lowest assigned error rate from a selected first weak classifier set with a second weak classifier with a lowest assigned error rate from a selected second weak classifier set.

10. The system of claim 9, wherein the computer is further configured to:

select a first candidate part-based action from the candidate part-based action set;

utilize a first weak classifier to compare the first candidate part-based action with one or more of the training samples included in the training sample set;

assign an error rate to the first weak classifier as a result of the comparison of the selected candidate part-based action with the one or more training samples; and add the first weak classifier to a first weak classifier set from the one or more weak classifiers sets;

select a second candidate part-based action from the candidate part-based action set;

utilize an second weak classifier to compare the second candidate part-based action with one or more of the training samples included in the training sample set;

rate the second weak classifier as a result of the comparison of the selected candidate part-based action with the one or more training samples; and add the second weak classifier to the weak classifier set.

11. The system of claim 9, wherein the first weak classifier utilizes an exemplar feature of the first candidate part based action and an exemplar feature of the one or more training samples when comparing the first candidate part based action with the one or more training samples.

12. The system of claim 9, wherein the computer is further configured to identify a motion pattern through the use of the strong classifier.

* * * * *